(12) United States Patent
Funada

(10) Patent No.: US 11,181,923 B2
(45) Date of Patent: Nov. 23, 2021

(54) DETECTION SYSTEM, DETECTION METHOD, AND PROGRAM

(71) Applicant: NEC Corporation, Tokyo (JP)

(72) Inventor: Junichi Funada, Tokyo (JP)

(73) Assignee: NEC CORPORATION, Tokyo (JP)

(*) Notice: Subject to any disclaimer, the term of this patent is extended or adjusted under 35 U.S.C. 154(b) by 265 days.

(21) Appl. No.: 15/580,810

(22) PCT Filed: Apr. 28, 2016

(86) PCT No.: PCT/JP2016/063332
§ 371 (c)(1),
(2) Date: Dec. 8, 2017

(87) PCT Pub. No.: WO2016/208274
PCT Pub. Date: Dec. 29, 2016

(65) Prior Publication Data
US 2018/0164177 A1    Jun. 14, 2018

(30) Foreign Application Priority Data

Jun. 23, 2015    (JP) .............................. JP2015-125836

(51) Int. Cl.
*G05D 1/02*     (2020.01)
*G05D 1/00*     (2006.01)
(Continued)

(52) U.S. Cl.
CPC ............ *G05D 1/0223* (2013.01); *G01M 3/24* (2013.01); *G01N 21/84* (2013.01); *G01N 21/954* (2013.01);
(Continued)

(58) Field of Classification Search
None
See application file for complete search history.

(56) References Cited

U.S. PATENT DOCUMENTS 4,457,163 A * 7/1984 Jackle .................... G01N 29/14
73/40.5 A
5,002,145 A * 3/1991 Wakaumi ................. B62D 1/28
180/168
(Continued)

FOREIGN PATENT DOCUMENTS

CN     103488175 A        1/2014
CN     104517111 A  *     4/2015
(Continued)

OTHER PUBLICATIONS

Machine Translation for CN104517111 (Year: 2015).*
(Continued)

*Primary Examiner* — Catherine T. Rastovski
*Assistant Examiner* — Leonard S Liang
(74) *Attorney, Agent, or Firm* — Sughrue Mion, PLLC

(57) ABSTRACT

An object of the invention is to provide a new defect detection technique using an autonomously movable apparatus. In order to accomplish the object, the invention provides a detection system (10) including a drive control unit (15) that controls a driving unit (12) causing a base unit (11) to travel in a case where a predetermined detection target is detected on the basis of information collected by a sensor unit (13) installed in the base unit (11), and a second detection unit (16) that detects a predetermined defect on the basis of the information collected by the sensor unit (13).

10 Claims, 6 Drawing Sheets

(51) Int. Cl.
| | | |
|---|---|---|
| *G01N 21/954* | (2006.01) | |
| *G01N 21/84* | (2006.01) | |
| *G01M 3/24* | (2006.01) | |
| *G01N 29/265* | (2006.01) | |
| *G01N 29/22* | (2006.01) | |
| *G06K 9/00* | (2006.01) | |
| *G01M 3/02* | (2006.01) | |

(52) U.S. Cl.
CPC ............ *G01N 29/22* (2013.01); *G01N 29/265* (2013.01); *G05D 1/0088* (2013.01); *G01M 3/02* (2013.01); *G05D 2201/0207* (2013.01); *G06K 9/00791* (2013.01)

(56) References Cited

U.S. PATENT DOCUMENTS

| | | | | |
|---|---|---|---|---|
| 6,247,353 | B1* | 6/2001 | Battenberg | G01H 1/003 73/40.5 A |
| 8,914,171 | B2* | 12/2014 | Noffsinger | B61L 3/121 701/19 |
| 9,411,338 | B2* | 8/2016 | Hanaoka | G01B 11/24 |
| 9,456,545 | B2* | 10/2016 | Biber | A01D 34/008 |
| 9,507,346 | B1* | 11/2016 | Levinson | B60W 30/0956 |
| 10,108,200 | B2* | 10/2018 | Etoh | G05D 1/0223 |
| 10,349,794 | B2* | 7/2019 | Watanabe | A47L 9/009 |
| 10,365,657 | B2* | 7/2019 | Tokuyama | G05D 1/0246 |
| 10,416,676 | B2* | 9/2019 | Naka | G05D 1/0088 |
| 10,444,755 | B2* | 10/2019 | Kuroda | B60W 40/06 |
| 10,444,758 | B2* | 10/2019 | Serizawa | G06K 9/2036 |
| 2003/0033881 | A1* | 2/2003 | Lam | G01N 29/0609 73/627 |
| 2003/0172735 | A1* | 9/2003 | Lam | G01N 29/0609 73/622 |
| 2007/0156286 | A1* | 7/2007 | Yamauchi | G05D 1/0038 700/245 |
| 2008/0158014 | A1* | 7/2008 | Zou | G06K 9/00805 340/988 |
| 2009/0037033 | A1* | 2/2009 | Phillips | G05D 1/0278 701/2 |
| 2009/0043440 | A1* | 2/2009 | Matsukawa | G05D 1/0214 701/25 |
| 2009/0105925 | A1* | 4/2009 | Harada | G08G 1/0104 701/99 |
| 2010/0049388 | A1* | 2/2010 | Moriguchi | G05D 1/0227 701/22 |
| 2010/0076631 | A1* | 3/2010 | Mian | B61G 7/04 701/19 |
| 2010/0082193 | A1* | 4/2010 | Chiappetta | G05D 1/0225 701/24 |
| 2010/0157043 | A1 | 6/2010 | Demers et al. | |
| 2012/0253628 | A1 | 10/2012 | Maruyama | |
| 2013/0141577 | A1* | 6/2013 | Yoo | G01S 17/88 348/148 |
| 2013/0170701 | A1* | 7/2013 | Suzuki | G06T 7/00 382/103 |
| 2015/0362921 | A1* | 12/2015 | Hanaoka | G01B 11/24 701/23 |
| 2016/0062361 | A1* | 3/2016 | Nakano | G05D 1/024 701/25 |
| 2016/0132056 | A1* | 5/2016 | Yoshino | G01S 17/08 701/23 |
| 2016/0170412 | A1* | 6/2016 | Yamamoto | G05D 1/024 701/23 |
| 2016/0282219 | A1* | 9/2016 | Kinoshita | G01M 3/26 |
| 2016/0375862 | A1* | 12/2016 | Ito | B60R 25/1004 348/148 |
| 2017/0072967 | A1* | 3/2017 | Fendt | B60W 10/18 |
| 2017/0079195 | A1* | 3/2017 | Yokoyama | A01B 69/00 |
| 2017/0153641 | A1* | 6/2017 | Serizawa | G01C 3/08 |
| 2017/0176343 | A1* | 6/2017 | Krishnan | G01N 21/954 |
| 2017/0227971 | A1* | 8/2017 | Shimotani | B60W 30/12 |
| 2017/0240170 | A1* | 8/2017 | Tani | G05D 1/0223 |
| 2017/0270369 | A1* | 9/2017 | Shiromizu | G06K 9/00791 |
| 2017/0315559 | A1* | 11/2017 | Etoh | G05D 1/0223 |
| 2017/0316692 | A1* | 11/2017 | Rusciolelli | G08G 1/164 |
| 2017/0330455 | A1* | 11/2017 | Kikuchi | G06K 9/00798 |
| 2018/0074497 | A1* | 3/2018 | Tsuji | B60R 16/02 |
| 2018/0357484 | A1* | 12/2018 | Omata | G08G 1/00 |
| 2018/0357493 | A1* | 12/2018 | Takamatsu | G08G 1/096725 |
| 2018/0362048 | A1* | 12/2018 | Juno | B60R 1/00 |
| 2019/0061775 | A1* | 2/2019 | Emura | B60R 21/00 |
| 2019/0171214 | A1* | 6/2019 | Cestonaro | A01D 34/008 |

FOREIGN PATENT DOCUMENTS

| | | | |
|---|---|---|---|
| DE | 102014000342 A1 | | 7/2015 |
| JP | 56021030 A | * | 2/1981 |
| JP | S58-058460 A | | 4/1983 |
| JP | H01-97831 A | | 4/1989 |
| JP | H01-121732 A | | 5/1989 |
| JP | H05-180813 A | | 7/1993 |
| JP | H05-322688 A | | 12/1993 |
| JP | H06-138107 A | | 5/1994 |
| JP | H06-258295 A | | 9/1994 |
| JP | H09-281089 A | | 10/1997 |
| JP | 2002-296142 A | | 10/2002 |
| JP | 2005-181140 A | | 7/2005 |
| JP | 2008097089 A | * | 4/2008 |
| JP | 2011242293 A | * | 12/2011 |
| JP | 2012163998 A | * | 8/2012 |
| JP | 5427202 B2 | | 2/2014 |
| JP | 5518579 B2 | * | 6/2014 |
| TW | I393597 B | | 4/2013 |
| WO | 2014058337 A1 | | 4/2014 |

OTHER PUBLICATIONS

Machine Translation for JP2005181140 (Year: 2005).*
Machine Translation for JP2008097089 (Year: 2008).*
Machine Translation for JPH06138107 (Year: 1994).*
Machine Translation for JPH0981089 (Year: 1997).*
International Search Report for PCT Application No. PCT/JP2016/063332, dated Aug. 2, 2016.
Taiwanese Office Action for TW Application No. 105115273 dated Aug. 6, 2018 with English Translation.
Japanese Office Action for JP Application No. 2017-524712 dated Apr. 23, 2019 with English Translation.
Extended European Search Report for EP Application No. EP16814045.7 dated Jan. 7, 2019.
Japanese Office Action for JP Application No. 2017-524712 dated Oct. 1, 2019 with English Translation.

* cited by examiner

DETECTION SYSTEM, DETECTION METHOD, AND PROGRAM

This application is a National Stage Entry of PCT/JP2016/063332 filed on Apr. 28, 2016, which claims priority from Japanese Patent Application 2015-125836 filed on Jun. 23, 2015, the contents of all of which are incorporated herein by reference, in their entirety.

TECHNICAL FIELD

The present invention relates to a detection system, a detection method, and a program.

BACKGROUND ART

Patent Document 1 discloses an autonomous traveling flaw detection apparatus. The autonomous traveling flaw detection apparatus collects information by a flaw detection sensor while moving and detects a surface defect or an internal defect in a plate to be inspected.

Patent Document 2 discloses a vehicle operation assist apparatus. The vehicle operation assist apparatus displays a speed limit, indicated by a road sign recognized on the basis of an image obtained by capturing the front view of the vehicle during traveling at a vehicle speed set by the driver in advance, to be comparable with the set vehicle speed when the speed limit is different from the set vehicle speed, and receives the driver's selection. The vehicle operation assist apparatus maintains the set vehicle speed or switches to the vehicle speed limit in accordance with the driver's selection.

RELATED DOCUMENT

Patent Document

[Patent Document 1] Japanese Patent Application Publication No. 6-138107
[Patent Document 2] Japanese Patent No. 5427202

SUMMARY OF THE INVENTION

Technical Problem

In a case of the technique disclosed in Patent Document 1, improved defect detection accuracy and a reduced examination time (faster examination) have a trade-off relationship.

The accuracy in defect detection is improved by reducing the moving speed of the apparatus and collecting more information in more detail. However, when the moving speed of the apparatus is reduced, a longer time is required for the examination.

In addition, it is possible to reduce the time required for examination by increasing the moving speed of the apparatus. However, an increase in the moving speed of the apparatus causes a reduced amount of collected information and the like, thus resulting in deterioration in the defect detection accuracy.

The inventions disclosed in Patent Documents 1 and 2 cannot solve the above problem.

An object of the invention is to provide a new defect detection technique using an autonomously movable apparatus.

Solution to Problem

According to the invention, there is provided a detection system including a drive control unit that controls traveling of a base member in a case where a predetermined detection target is detected on the basis of information collected by a sensor unit installed in the base member, and a second detection unit that detects a predetermined defect on the basis of the information collected by the sensor unit.

In addition, according to the invention, there is provided a detection method executed by a computer, the method including a drive control step of controlling traveling of a base member in a case where a predetermined detection target is detected on the basis of information collected by a sensor unit installed in the base member, and a second detection step of detecting a predetermined defect on the basis of the information collected by the sensor unit.

In addition, according to the invention, there is provided a program causing a computer to function as a drive control unit that controls traveling of a base member in a case where a predetermined detection target is detected on the basis of information collected by a sensor unit installed in the base member, and second detection unit that detects a predetermined defect on the basis of the information collected by the sensor unit.

Advantageous Effects of Invention

According to the invention, a new defect detection technique using an autonomously movable apparatus is achieved.

BRIEF DESCRIPTION OF THE DRAWINGS

The above-described objects, other objects, features and advantages will be further apparent from the preferred example embodiments described below, and the accompanying drawings as follows.

DESCRIPTION OF EXAMPLE EMBODIMENTS

First, an example of a hardware configuration of a system according to the example embodiment will be described. Units included in the system of the embodiment are implemented by any combination of hardware and software on the basis of a central processing unit (CPU), a memory, a program loaded into the memory, a storage unit (can also store not only a program stored prior to shipment but also a program downloaded from a storage medium such as a compact disc (CD), or a server or the like on the Internet) such as a hard disk which stores the program, and an interface for network connection of an arbitrary computer. In addition, one skilled in the art can understand that various modification examples can be made to the implementation method and the apparatus.

Figure 1:
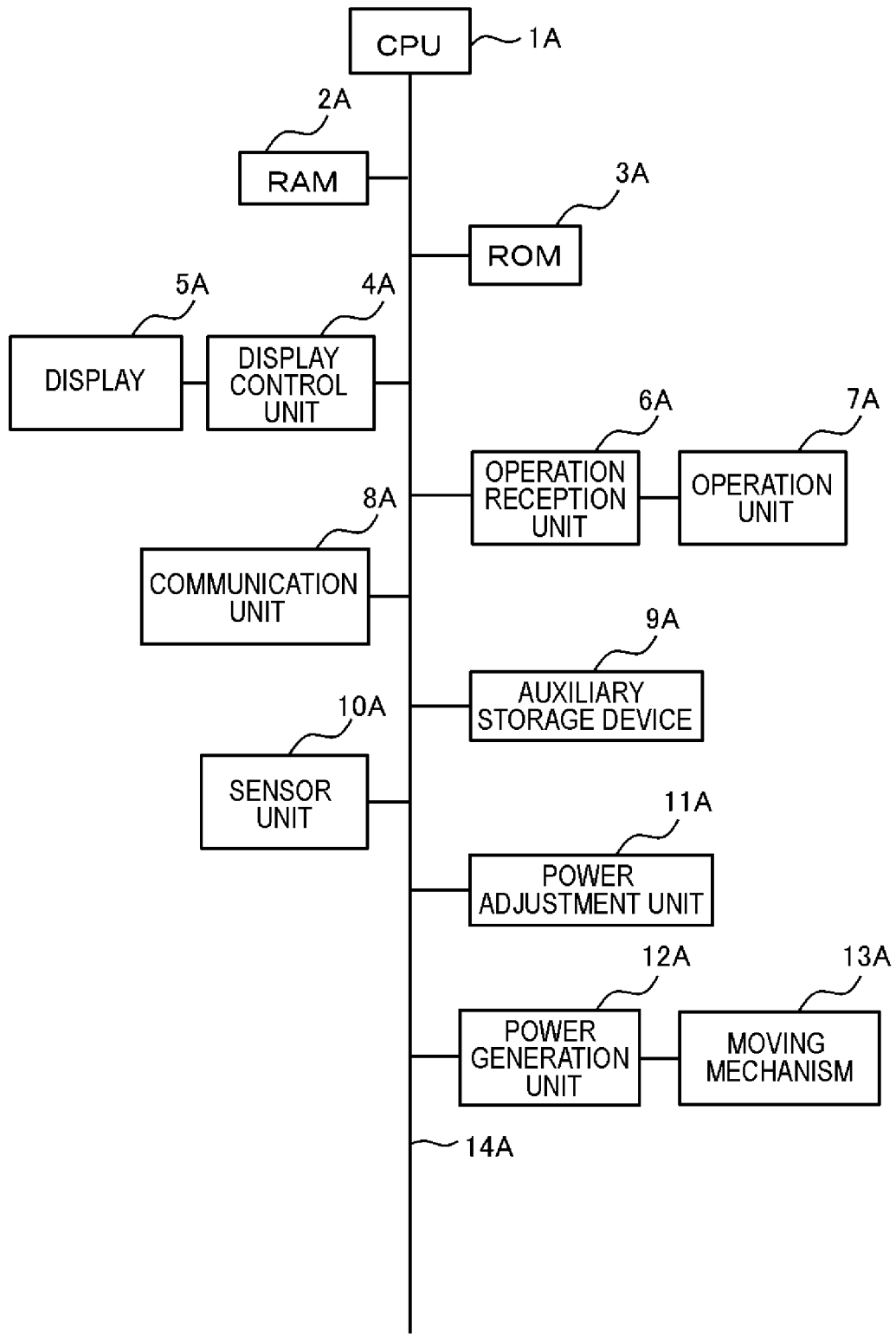
FIG. 1 is a schematic diagram illustrating an example of a hardware configuration of a detection system according to the example embodiment.

FIG. 1 is a schematic diagram illustrating an example of a hardware configuration of a detection system according to the example embodiment. As illustrated in the drawing, the system according to the example embodiment includes, for example, a CPU 1A, a Random Access Memory (RAM) 2A, a Read Only Memory (ROM) 3A, a display control unit 4A, display 5A, an operation reception unit 6A, an operation unit 7A, a communication unit 8A, an auxiliary storage apparatus 9A, a power adjustment unit 11A, and the like which are connected to each other through a bus 14A. The detection system may further include a sensor unit 10A, a power generation unit 12A, and a moving mechanism 13A. Although not shown in the drawing, the detection system may further include other elements such as a speaker.

Note that, at least one of the sensor unit 10A and the power adjustment unit 11A may be connected to the communication unit 8A without being directly connected to the bus 14A. For example, at least one of the sensor unit 10A and the power adjustment unit 11A may be included in an apparatus physically separated from the apparatus including the CPU 1A, the RAM 2A, the ROM 3A, the display control unit 4A, the display 5A, the operation reception unit 6A, the operation unit 7A, the communication unit 8A, and the auxiliary storage apparatus 9A. Information sensed by the sensor unit 10A may be input through the communication unit 8A. In addition, a control signal may be input to the power adjustment unit 11A or the sensor unit 10A through the communication unit 8A.

The CPU 1A controls the overall computer of the apparatus together with the elements. The ROM 3A includes an area that stores programs for operating the computer, various application programs, various setting data used when the programs are operated, and the like. The RAM 2A includes an area, such as a work area for the operation of programs, which temporarily stores data. The auxiliary storage apparatus 9A is, for example, a Hard Disc Drive (HDD) that can store large-capacity data.

The display 5A is, for example, a display apparatus (a Light Emitting Diode (LED) display), a liquid crystal display, an organic Electro Luminescence (EL) display, or the like). The display 5A may be a touch panel display integrally formed with a touch pad. The display control unit 4A reads out data stored in a Video RAM (VRAM), performs predetermined processing on the read-out data, and then transmits the processed data to the display 5A to thereby perform various screen displays.

The operation reception unit 6A receives various operations through the operation unit 7A. The operation unit 7A includes operation keys, operation buttons, switches, a jog dial, a touch panel display, a keyboard, and the like.

The communication unit 8A is connected to a network such as the Internet or a Local Area Network (LAN), for example, in a wired and/or wireless manner, and communicates with another electrical apparatus. In addition, the communication unit 8A can also be directly connected to another apparatus through a cable to communicate therewith.

The sensor unit 10A collects predetermined information. For example, the sensor unit 10A may be a camera. In this case, the sensor unit 10A collects captured images. In addition, the sensor unit 10A may be a microphone. In this case, the sensor unit 10A collects sounds. In addition, the sensor unit 10A may be a distance sensor. In this case, the sensor unit 10A collects information regarding a distance to a predetermined object. For example, the sensor unit 10A can continuously collect these pieces of information at predetermined time intervals. The information collected by the sensor unit 10A is accumulated in, for example, the auxiliary storage apparatus 9A.

The moving mechanism 13A constituted by a wheel or the like is attached to a base member. The sensor unit 10A is installed in the base member. The power generation unit 12A, which is a power generation apparatus such as a motor, transmits generated power to the moving mechanism 13A to cause the base member to travel. The power adjustment unit 11A, which is a power adjustment apparatus such as an inverter, controls the operation of the power generation unit 12A (for example, the rotation speed of the motor).

Hereinafter, the example embodiment will be described. Note that a functional block diagram to be used in the following description of the example embodiment shows a function-based block rather than a hardware-based configuration. In the functional block diagram, although description is given such that each system is implemented by one apparatus, an implementing means thereof is not limited thereto. In other words, each apparatus may be configured to be physically or logically separated. Note that, the same components are denoted by the same reference numerals and signs, and a description thereof will be appropriately omitted.

First, an outline of a detection system 10 of the example embodiment will be described. The detection system 10 causes the base member having the sensor installed therein to travel at a predetermined speed. A defect is detected on the basis of information collected by the sensor during traveling.

The detection system 10 performs, on the basis of information collected by the sensor, (1) processing of detecting a sign indicating the possibility of a presence of a defect (hereinafter, referred to as a "defect-indicating sign") and (2) processing of detecting a defect.

A detection result of (1) is used for controlling traveling of the base member. A traveling speed, travel/stop, and the like of the base member are controlled on the basis of the detection result of (1).

Specifically, when a defect-indicating sign is detected through the processing of (1), the traveling speed of the base member is decreased or the base member is stopped from traveling. This control allows to collect detailed information regarding the location where the defect-indicating sign is present, that is, the location required to be examined in detail. The processing of (2) is performed on the basis of such information, and thus the accuracy of detection of a defect is improved.

On the other hand, the traveling speed of the base member is comparatively increased while no defect-indicating sign is detected in the processing of (1). The control allows to achieve a reduction in examination time at a location where no defect-indicating sign is present, that is, a location not required to be examined in detail.

According to such a detection system, it is possible to achieve a reduction in time required for examination while maintaining the accuracy in defect detection.

Figure 2:
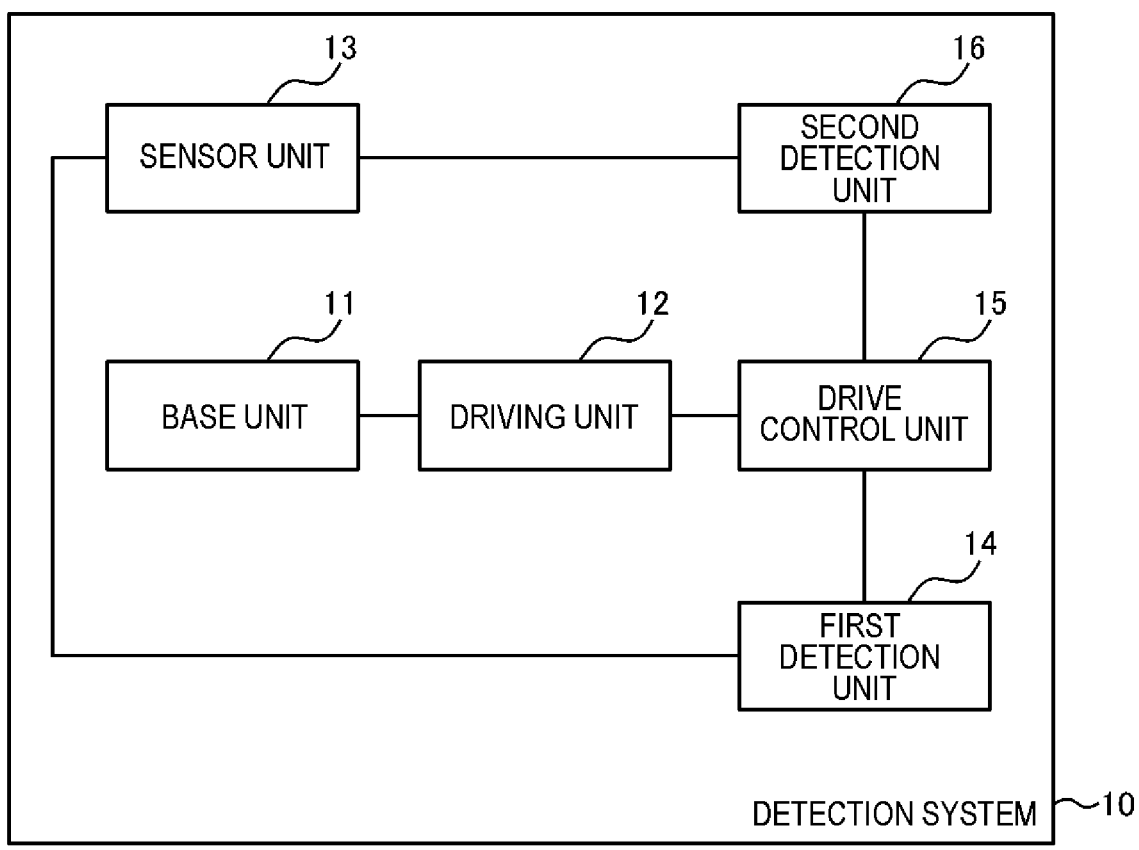
FIG. 2 is an example of a functional block diagram of the detection system according to the example embodiment.

Hereinafter, a configuration of the example embodiment will be described in detail. FIG. 2 illustrates an example of a functional block diagram of the detection system 10 according to the example embodiment. As illustrated in the drawing, the detection system 10 includes a base unit 11, a driving unit 12, a sensor unit 13, a first detection unit 14, a drive control unit 15, and a second detection unit 16.

Figure 6:
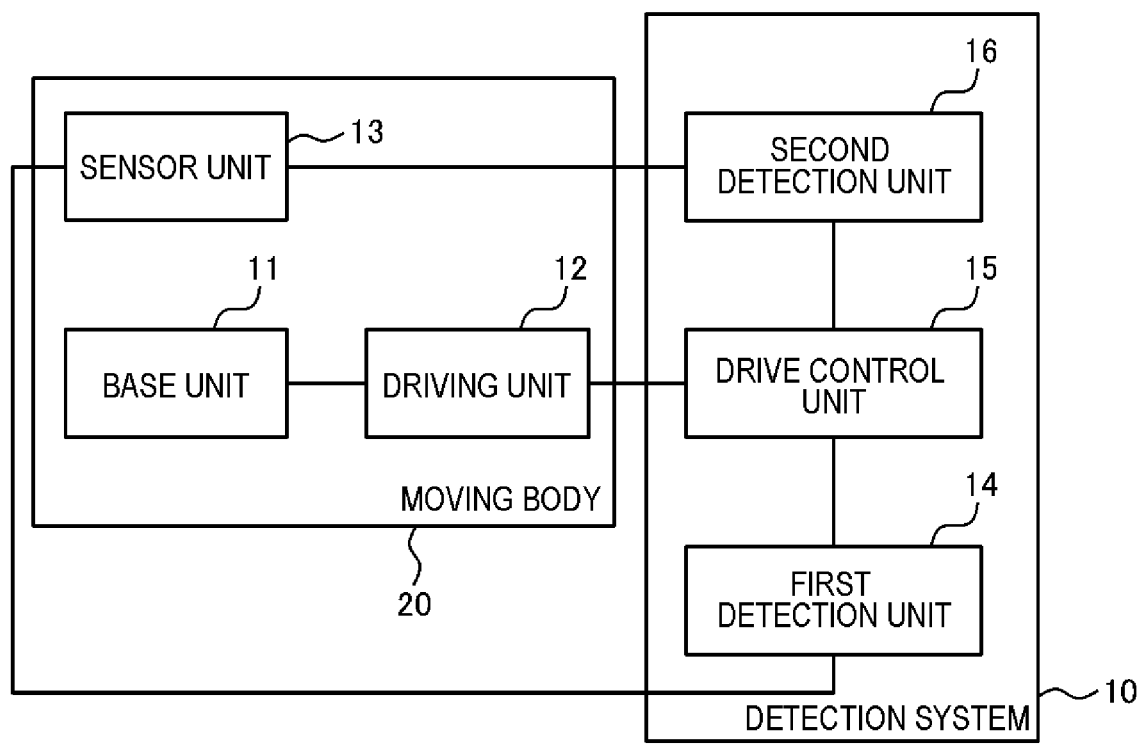
FIG. 6 is an example of a functional block diagram of the detection system according to the example embodiment.

As illustrated in a functional block diagram of FIG. 6, the detection system 10 can also be configured to include the first detection unit 14, the drive control unit 15, and the second detection unit 16 without including the base unit 11, the driving unit 12, and the sensor unit 13. In this case, a moving body 20 including the base unit 11, the driving unit 12, and the sensor unit 13 cooperates with the detection system 10.

The base unit (base member) 11 is an object which is configured such that a sensor, a substrate, a power generation apparatus, a power adjustment apparatus, and the like can be installed therein. The shape, size, material, strength, and the like thereof are matters of design, and can be determined in accordance with an examining object, an object to be installed, and the like. The base unit 11 includes a moving mechanism (corresponding to the moving mechanism 13A of FIG. 1) such as a wheel, and is movably configured. When predetermined power is applied to the base unit 11, the base unit 11 travels in a predetermined direction.

The driving unit 12 applies power to the moving mechanism included in the base unit 11 to cause the base unit 11 to travel. The driving unit 12 is configured to be capable of adjusting power to be applied to the moving mechanism included in the base unit 11. The driving unit 12 is configured to include a power adjustment apparatus such as an inverter and a power generation apparatus such as a motor. The driving unit 12 is installed in the base unit 11. The driving unit 12 corresponds to the power adjustment unit 11A and the power generation unit 12A that are illustrated in FIG. 1.

The sensor unit 13 is installed in the base unit 11 and collects predetermined information. For example, the sensor unit 10A may be a camera. In this case, the sensor unit 10A collects captured images. In addition, the sensor unit 10A may be a microphone. In this case, the sensor unit 10A collects sounds. In addition, the sensor unit 10A may be a distance sensor. In this case, the sensor unit 10A collects information on a distance to a predetermined object. Note that the above configurations are just examples and the sensor unit is not limited thereto. The sensor unit 13 can continuously collect predetermined information at predetermined time intervals. The sensor unit 13 corresponds to the sensor unit 10A illustrated in FIG. 1.

The first detection unit 14 detects a predetermined detection target on the basis of the information collected by the sensor unit 13. The first detection unit 14 performs the above-described "(1) processing of detecting a defect-indicating sign".

The predetermined detection target to be detected by the first detection unit 14 is a sign indicating the possibility of a presence of a defect (defect-indicating sign). The defect-indicating sign varies depending on the type of a defect, a location where the detection is performed, information to be collected by the sensor unit 13, and the like. The first detection unit 14 holds information indicating a feature of a predetermined defect-indicating sign in advance. A location showing such a feature is detected from the information collected by the sensor unit 13. Which feature included in the information collected by the sensor unit 13 is to be set as a defect-indicating sign is a matter of design. For example, the defect-indicating sign may be determined on the basis of the past empirical rule, the analysis of sensor information including the defect, and the like.

The detection result of the first detection unit 14 is input to the drive control unit 15 to be described below. The detection result of the first detection unit 14 is used for controlling the driving unit 12, that is, for controlling traveling of the base unit 11. Note that the detection result of the first detection unit 14 is not used as a determination result (examination result) of the presence or absence of a defect. The first detection unit 14 is implemented by the CPU 1A, the RAM 2A, the ROM 3A, the communication unit 8A, the auxiliary storage apparatus 9A, and the like illustrated in FIG. 1.

The drive control unit 15 controls the operation (for example, a rotation speed of the motor) of the driving unit 12 in accordance with the detection result of the first detection unit 14. That is, the drive control unit 15 inputs a control signal based on the detection result of the first detection unit 14 into a power adjustment apparatus (for example, an inverter) of the driving unit 12. The drive control unit 15 is implemented by the CPU 1A, the RAM 2A, the ROM 3A, the communication unit 8A, the auxiliary storage apparatus 9A, and the like illustrated in FIG. 1.

Specifically, the drive control unit 15 controls the driving unit 12 to cause the base unit 11 to travel at a first speed from start of the processing until the first detection unit 14 detects a predetermined detection target (defect-indicating sign). When the first detection unit 14 detects the predetermined detection target, the drive control unit 15 controls the driving unit 12 to cause the base unit 11 to travel at a second speed lower than the first speed or to cause the base unit 11 to stop traveling. The drive control unit 15 controls the driving unit 12 to cause the base unit 11 to travel at the first speed at a predetermined timing, after the drive control unit controls the driving unit 12 to cause the base unit 11 to travel at the second speed or to cause the base unit 11 to stop traveling.

For example, the above-mentioned predetermined timing may be a timing at which a predetermined time has passed since the timing at which the driving unit 12 was controlled to cause the base unit 11 to travel at the second speed or to cause the base unit 11 to stop traveling. In addition, examples of the possible predetermined timing include a timing at which detection processing of the second detection unit 16 is ended, a timing at which a predetermined amount of data (for example, image data of a predetermined frame) is collected by the sensor unit 13 while the base unit 11 travels at the second speed or is stopped, and the like.

The second detection unit 16 detects a predetermined defect on the basis of the information collected by the sensor unit 13. The second detection unit 16 performs the above-described "(2) processing of detecting a defect". When the second detection unit 16 ends the processing of detecting a defect, the second detection unit may input a signal indicating the end of the processing to the drive control unit 15.

The second detection unit 16 holds information indicating a feature of the defect in advance. A location indicating such a feature is detected from the information collected by the sensor unit 13.

The detection result of the second detection unit 16 is output as a determination result (examination result) of the presence or absence of a defect. For example, the detection result may be output through an output apparatus such as a display, a speaker, a warning lamp, a mailer, or a printer, or may be stored in a storage apparatus. The detection result of the second detection unit 16 may be used for controlling the driving unit 12 by the drive control unit 15. The second detection unit 16 is implemented by the CPU 1A, the RAM 2A, the ROM 3A, the communication unit 8A, the auxiliary storage apparatus 9A, and the like illustrated in FIG. 1.

Both the first detection unit 14 and the second detection unit 16 are common in performing the processing of detecting a predetermined feature from the information collected by the sensor unit 13 on the basis of the information. However, the positioning of the detection results, that is, the subsequent use modes of the results are different from each other. For this reason, there may be at least one of the following differences between the detection processing.

(Difference 1-1) "(1) Difference in Features (Dictionary Data) of Detection Target Used in Detection Processing"

Both features used for the respective detection processing by the first detection unit 14 and the second detection unit 16 are related to defects. However, the first detection unit 14 and the second detection unit 16 are different from each other in that the first detection unit 14 detects a defect-indicating sign indicating the possibility of a presence of a defect, whereas the second detection unit 16 detects a defect. For this reason, the features (dictionary data) used for the respective detection processing by the first detection unit 14 and the second detection unit 16 may be different from each other.

Figure 3:
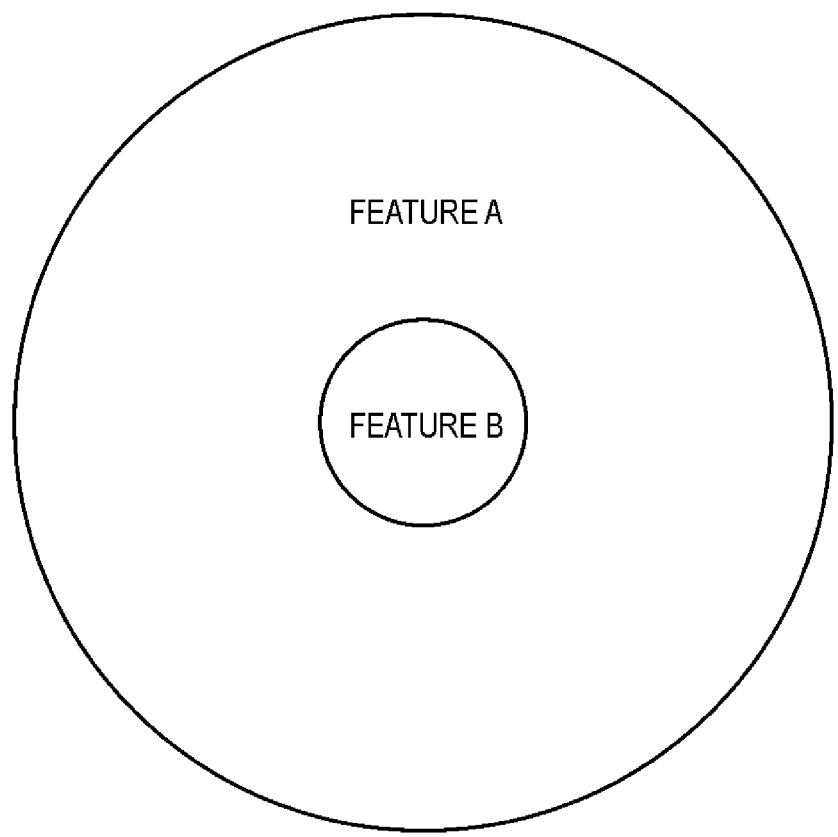
FIG. 3 is a diagram illustrating an example of a difference between a first detection unit and a second detection unit according to the example embodiment.

For example, as illustrated in FIG. 3, a feature "A" used by the second detection unit 16 may include a feature "B" used by the first detection unit 14. In this case, the detection target of the first detection unit 14 includes targets including the entire feature "B". On the other hand, the detection target of the second detection unit 16 includes targets including the entire feature "A" including the feature B. As the number of requirements (features) to be included increases, the accuracy of detection of a defect in the detection processing of the second detection unit 16 becomes higher.

(Difference 1-2) "(2) Difference in Features (Dictionary Data) of Detection Target Used in Detection Processing"

In Difference 1-1, both the targets detected by the first detection unit 14 and the second detection unit 16 were defects. As another example, targets to be detected by the first detection unit 14 and the second detection unit 16 may be different from each other. For example, the detection target of the second detection unit 16 may be a defect, and the detection target of the first detection unit 14 may be a location where defects easily occur, a characteristic location derived from a defect, or the like. For example, in a case where piping is to be inspected, the detection target of the first detection unit 14 may be a location where defects (for example, water leakage) easily occur, such as a mounting pipe, a coupling joint, or a joint between pipes.

(Difference 2) "Difference in Threshold Values (Degree of Likelihood, Degree of Similarity, and the like) used for Determination of Detection Target"

For example, a threshold value "B" used for determining a detection target by the second detection unit 16 may be higher than a threshold value "A" used for determining a detection target by the first detection unit 14. In this case, the features (dictionary data) used in the respective detection processing by the first detection unit 14 and the second detection unit 16 may be the same as or different from each other.

(Difference 3) "Difference in Detection Algorithms"

For example, algorithms may be designed so that the accuracy in defect detection in the detection processing of the second detection unit 16 is higher than that of the first detection unit 14. In this case, features (dictionary data) used in the respective detection processing by the first detection unit 14 and the second detection unit 16 may be the same as or different from each other.

(Difference 4-1) "(1) Use of Different Information"

The number of types of information handled by the second detection unit 16 may be greater than that of the first detection unit 14. For example, the second detection unit 16 may perform detection processing on the basis of information collected by a plurality of types of sensors (for example, a camera, a microphone, a distance sensor, and the like), whereas the first detection unit 14 may perform detection processing on the basis of information collected by one type of sensor or a smaller number of types of sensors than that of the second detection unit 16.

(Difference 4-2) "(2) Use of Different Information"

The second detection unit 16 may perform detection processing on the basis of only information collected while the base unit 11 travels at the second speed or while the base unit 11 is stopped. That is, the second detection unit 16 does not need to use information collected during traveling of the base unit 11 at the first speed for the detection processing. On the other hand, the first detection unit 14 may use all information collected by the sensor unit 13 for the detection processing, regardless of the details of traveling of the base unit 11. In this case, features (dictionary data) used in the respective detection processing by the first detection unit 14 and the second detection unit 16 may be the same as or different from each other.

For example, the second detection unit 16 may start detection processing when the first detection unit 14 detects a detection target. Specifically, the second detection unit 16 may start acquiring information from the sensor unit 13 or start detection processing based on the information, in accordance with the detection of the detection target by the first detection unit 14. In addition, when the first detection unit 14 detects a detection target and the drive control unit 15 controls the driving unit 12 to cause the base unit 11 to travel at the second speed or to cause the base unit 11 to stop traveling, the second detection unit 16 may accordingly start acquiring information from the sensor unit 13 or start the detection processing based on the information.

In this manner, the second detection unit 16 can stop the processing until a detection target (defect-indicating sign) is detected by the first detection unit 14 and then start the processing in accordance with the detection. As a result, it is possible to reduce a processing load of the second detection unit 16.

The second detection unit 16 may also perform detection processing before the detection target (defect-indicating sign) is detected by the first detection unit 14. That is, the second detection unit 16 may perform detection processing by using not only information collected while the base unit 11 travels at the second speed or the base unit 11 is stopped but also information collected while the base unit 11 travels at the first speed.

In a case of this example, a detection result of the second detection unit 16 based on the information collected while the base unit 11 travels at the second speed or is stopped may be output as a determination result (examination result) of the presence or absence of a defect.

A detection result of the second detection unit 16 based on the information collected while the base unit 11 travels at the first speed may be input to the drive control unit 15 without being output as a determination result (examination result) of the presence or absence of a defect. The drive control unit 15 may control the driving unit 12 on the basis of the detection result which is input from the second detection unit 16.

In this case, when the drive control unit 15 receives an input indicating that a defect has been detected by the second detection unit 16, the drive control unit 15 controls the driving unit 12 to cause the base unit 11 to travel at the second speed lower than the first speed or to cause the base unit 11 to stop traveling. The drive control unit 15 controls the driving unit 12 to cause the base unit 11 to travel at the first speed at a predetermined timing after the drive control unit 15 controls the driving unit 12 to cause the base unit 11 to travel at the second speed or to cause the base unit 11 to stop traveling.

In the above-described example, the driving unit 12 is controlled in accordance with a detection result of the first detection unit 14 and/or the second detection unit 16. However, as another modification example, the sensor unit 13 may be controlled in accordance with a detection result of the first detection unit 14 and/or the second detection unit 16.

For example, the sensor unit 13 may transition between two modes (between first and second modes) differing in information collection accuracy, in accordance with a detection result of the first detection unit 14 and/or the second detection unit 16. For example, the first mode may be a mode having higher accuracy in information collection than the second mode. In addition, the second mode may be a mode having a higher noise removing function than the first mode. When a predetermined detection target is detected by the first detection unit 14 and/or the second detection unit 16, the sensor unit 13 may accordingly transition from the second mode to the first mode.

As an example, the number of sensors to be operated and the number of types thereof in the first mode may be greater than those in the second mode. For example, information may be collected by the operation of a camera and a microphone in the first mode, and information may be collected by the operation of only a microphone in the second mode.

As another example, in a case where the sensor unit 13 is a camera, the zoom magnification in the first mode may be higher in the second mode. In addition, a frame rate in the first mode may be higher in the second mode.

As another example, in a case where the sensor unit 13 is a microphone, a function of removing noise such as traveling noise may be higher in the second mode than in the first mode.

As another example, in a case where the sensor unit 13 is a distance sensor, the number of times of measuring a distance per unit time in the first mode may be greater than that in the second mode.

In this manner, the sensor unit 13 can be operated in the second mode with a small processing load until the detection of a detection target (defect-indicating sign) by the first detection unit 14 and/or the detection of a detection target by the second detection unit 16 (the detection of a defect based on the information collected during the traveling of the base unit 11 at the first speed) are performed, and start operating in the first mode with a large processing load in accordance with the detection. That is, the sensor unit can be operated in the second mode where a detailed examination is not required and in the first mode where a detailed examination is required. As a result, it is possible to reduce a processing load of the sensor unit 13 while maintaining the defect detecting accuracy.

In addition, the sensor unit can be operated in the second mode with a high function of removing noise such as a traveling sound noise during the traveling of the base unit 11 at a high speed (first speed) and operated in the first mode with a low function of removing noise such as traveling noise during traveling of the base unit 11 at a low speed (second speed) or when the base unit is stopped. As a result, a high noise removing function is used at an appropriate location and not used when there is no need, thus making it possible to reduce a processing load.

Figure 4:
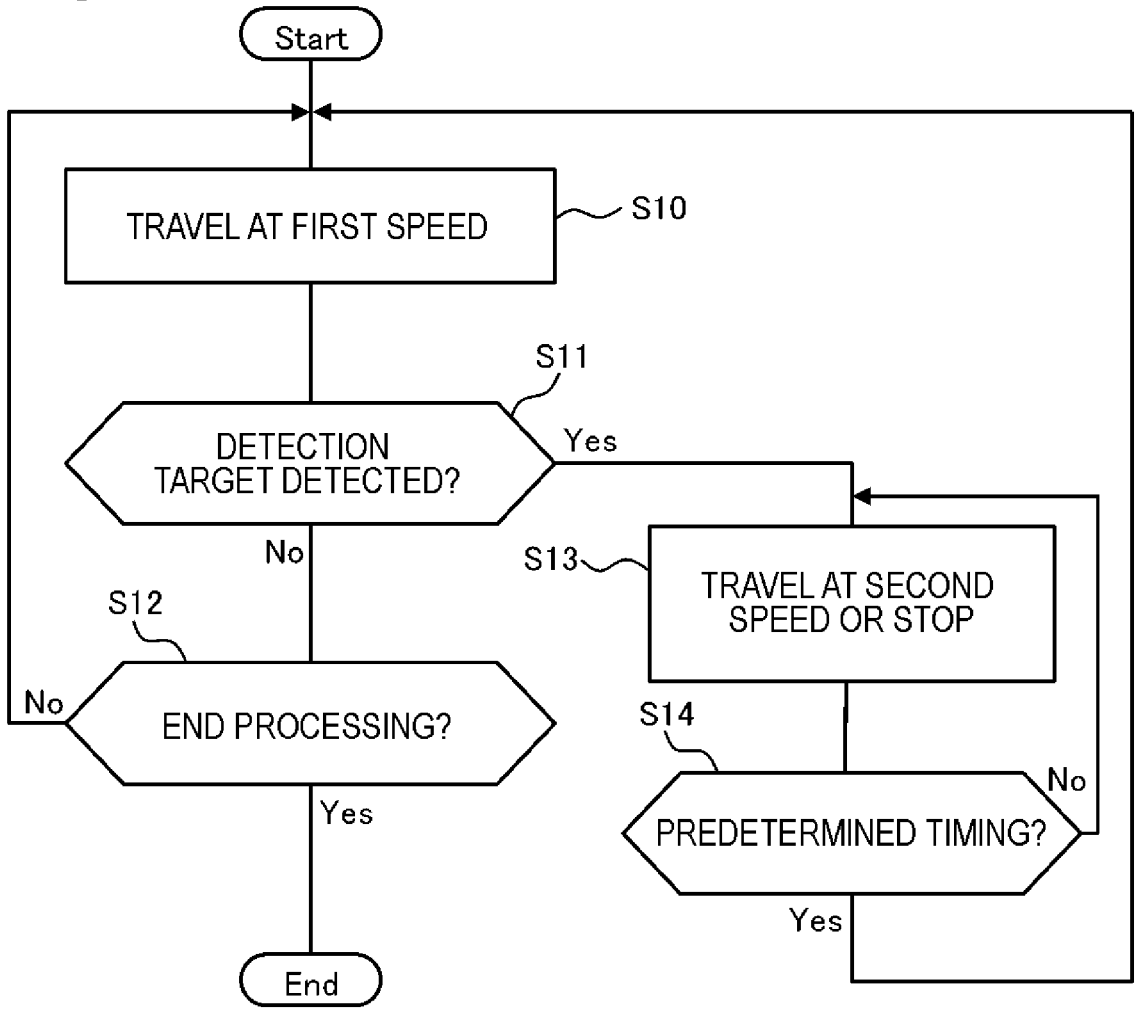
FIG. 4 is a flow chart illustrating an example of a flow of processing of the detection system according to the example embodiment.

Next, an example of a flow of processing of the detection system 10 according to the example embodiment will be described with reference to the flow chart of FIG. 4.

First, when processing for detecting a defect (hereinafter, "defect detection processing") is started, the drive control unit 15 controls the driving unit 12 to cause the base unit 11 to travel at the first speed. As a result, the base unit 11 starts traveling at the first speed (S10). In addition, when the defect detection processing is started, the sensor unit 13 installed in the base unit 11 starts to continuously collect predetermined information.

The first detection unit 14 performs processing of detecting a predetermined detection target (defect-indicating sign) on the basis of information collected by the sensor unit 13.

While no detection target is detected by the first detection unit 14 (No in S11) and no input for ending the defect detection processing is performed (No in S12), the traveling of the base unit 11 at the first speed, the collection of the predetermined information by the sensor unit 13, and the detection of the predetermined detection target by the first detection unit 14 are continued.

When the detection target is detected by the first detection unit 14 (Yes in S11), the drive control unit 15 controls the driving unit 12 to cause the base unit 11 to travel at the second speed lower than the first speed or to cause the base unit 11 to stop traveling. As a result, the base unit 11 starts traveling at the second speed or stops traveling (S13).

Even when the base unit 11 travels at the second speed or stops traveling, the sensor unit 13 installed in the base unit 11 continues collecting the predetermined information. The second detection unit 16 detects a defect on the basis of the information collected by the sensor unit 13 in the above state. The second detection unit 16 may start detection processing based on the information collected by the sensor unit 13 in accordance with the detection of the detection target by the first detection unit 14 (S11) or in accordance with the control by the drive control unit 15 (S13).

A detection result of the second detection unit 16 may be output through an output apparatus such as a display, a speaker, a warning lamp, a mailer, or a printer as a determination result (examination result) of the presence or absence of a defect, or may be stored in a storage apparatus.

When the drive control unit 15 reaches a predetermined timing after the driving unit 12 is controlled to cause the base unit 11 to travel at the second speed or to cause the base unit 11 to stop traveling (Yes in S14), the driving control unit 15 controls the driving unit 12 to cause the base unit 11 to travel at the first speed. As a result, the base unit 11 starts traveling at the first speed (S10). Hereinafter, the same processing will be repeated.

On the other hand, the base unit 11 continues traveling at the second speed or stops traveling while the drive control unit has not reached the predetermined timing after the driving unit 12 is controlled to cause the base unit 11 to travel at the second speed or to stop the base unit 11 from traveling (No in S14). In the meantime, the sensor unit 13 continues collecting the predetermined information (S13), and the second detection unit 16 continues detecting any defect on the basis of the information.

Next, application examples of the detection system 10 according to the example embodiment will be described.

Application Example 1

Figure 5:
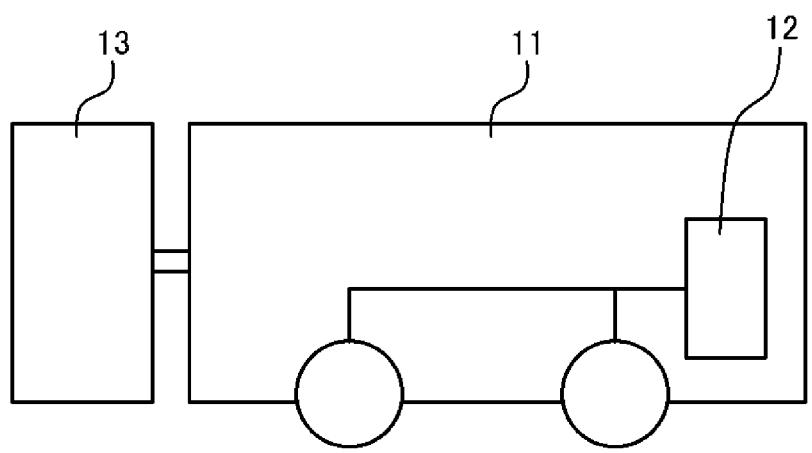
FIG. 5 is a diagram illustrating an application example of the detection system according to the example embodiment.

Application Example 1 will be described with reference to FIG. 5. FIG. 5 illustrates the base unit 11 including wheels, the driving unit 12 installed in the base unit 11, and the sensor unit 13. For example, such a moving body is caused to travel within an object to be examined to perform information collection through the sensor unit 13 and detection of defects based on the information.

At least one of the first detection unit 14, the drive control unit 15, and the second detection unit 16 may be provided in the base unit 11. As another example, at least one of the first detection unit 14, the drive control unit 15, and the second detection unit 16 may be provided in a control apparatus physically separated from the moving body. The control apparatus may be, for example, a personal computer (PC), a tablet terminal, a smart phone, or the like, or may be a server (for example, a cloud server) provided on the Internet. In this case, the base unit 11 is provided with a communication unit for communicating with the control apparatus by any communication standard. The communication is implemented in a wired and/or wireless manner. The information collected by the sensor unit 13 may be transmitted to the control apparatus, and a control signal from the drive control unit 15 may be input to the driving unit 12.

The examining object may be piping such as a pipeline or sewerage, for example. The second detection unit 16 may detect a defect in the piping. Note that the examining object may be another object.

Application Example 2

In Application Example 2, an examining object is set to be sewerage, and a defect to be detected is set to be infiltrating water. In Application Example 2, a microphone is applied as the sensor unit 13. A camera may be further applied as the sensor unit 13.

The first detection unit 14 detects continuous sounds of water dripping over a predetermined period of time or longer. The first detection unit 14 detects a location (defect-indicating sign) where a feature of water dripping sounds held in advance is continuous for a predetermined time or longer in sound data collected by a microphone.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of the sound data collected by the microphone in the above state. For example, the second detection unit 16 detects a location (detection target) where a feature of water dripping sounds held in advance is continuous for a predetermined time or longer.

When the base unit 11 is moved at a high speed (first speed), noise such as a motor noise or a wind noise is easily included in the sound data collected by the microphone. On the other hand, when the traveling speed of the base unit 11 is reduced (second speed) and the base unit 11 is stopped, such noise can be reduced. As a result, the accuracy of estimation by the second detection unit 16 is improved.

The second detection unit 16 may further detect the above-mentioned defect on the basis of image data collected by the camera.

In a case of performing detection on the basis of image data, the motion of water drops may be detected. For example, the presence or absence of vertical movement is determined by optical flow. When the base unit 11 is moved at a low speed or is stopped, it is possible to collect image data of a sufficient time width. For this reason, it is possible to analyze such images.

By combining a detection result based on the sound data and a detection result based on the image data, the accuracy of detection of a defect by the second detection unit 16 is improved. For example, in a case where both the detection result based on the sound data and the detection result based on the image data indicate a "defect (presence of a detection target)", the second detection unit 16 may determine that a defect is present.

Application Example 3

In Application Example 3, an examination target is set to be sewerage, and a defect to be detected is set to be infiltrating water. In Application Example 3, a camera is applied as the sensor unit 13. A microphone may be further applied as the sensor unit 13.

The first detection unit 14 detects a puddle caused by infiltrating water. The first detection unit 14 detects a mass (defect-indicating sign) of a white region having an area equal to or greater than a fixed area present in an image captured by the camera. The puddle may be white in the image due to reflection of light.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of sound data collected by the microphone or image data collected by the camera in the above state. A configuration of the second detection unit 16 may be the same as that in Application Example 2.

Application Example 4

In Application Example 4, an examining object is set to be sewerage, and a defect to be detected is set to be infiltrating water. In Application Example 4, a camera is applied as the sensor unit 13. A microphone may be further applied as the sensor unit 13.

The first detection unit 14 detects infiltrating water by learning-type image recognition. The first detection unit 14 determines whether or not infiltrating water (defect-indicating sign) is present in image data collected by the camera, on the basis of the image data collected by the camera and a large number of pieces of teacher data (image data indicating infiltrating water) held in advance.

When the first detection unit 14 detects the detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of sound data collected by the microphone or image data collected by the camera in the above state. A configuration of the second detection unit 16 may be the same as that in Application Example 2.

Application Example 5

In Application Example 5, an examining object is set to be sewerage, and a defect to be detected is set to be infiltrating water. In Application Example 5, a camera is applied as the sensor unit 13. A microphone may be further applied as the sensor unit 13.

The first detection unit 14 detects a wet location (a wall, a ceiling, a floor, or the like) caused by infiltrating water. The first detection unit 14 detects a mass (defect-indicating sign) of a black region having an area equal to or greater than a fixed area which is present in an image captured by the camera. A region wet with water may be black in the image.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of sound data collected by the microphone or image data collected by the camera in the above state. A configuration of the second detection unit 16 may be the same as that in Application Example 2.

Application Example 6

In Application Example 6, an examining object is set to be sewerage, and a defect to be detected is set to be infiltrating water. In Application Example 6, a camera is applied as the sensor unit 13. A microphone may be further applied as the sensor unit 13.

The first detection unit 14 detects a location where infiltrating water easily occurs, for example, a mounting pipe, a coupling joint, a joint between pipes, or the like (defect-indicating sign). The first detection unit 14 detects the defect-indicating sign which is present in the image captured by the camera. For example, the detection may be performed by learning-type image recognition, or a detection target may be detected using a value close to a minimum value of a value obtained by integration of a pixel value in the circumferential direction for each advance of the base unit 11.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of sound data collected by the microphone or image data collected by the camera in the above state. A configuration of the second detection unit 16 may be the same as that in Application Example 2.

Application Example 7

In Application Example 7, an examining object is set to be sewerage, and a defect to be detected is set to be a crack. In Application Example 7, a camera is applied as the sensor unit 13.

The first detection unit 14 detects a crack (defect-indicating sign). The first detection unit 14 detects the defect-indicating sign which is present in the image captured by the camera.

For example, the detection may be performed by learning-type image recognition, or a crack may be detected by segment extraction.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of detailed image data collected by the camera (for example, image data captured with high magnification, image data obtained by capturing a certain location for a long period of time, or the like) in the above state.

Application Example 8

In Application Example 8, an examining object is set to be piping, and a defect to be detected is set to be mortar or lime. In Application Example 8, a camera is applied as the sensor unit 13.

The first detection unit 14 detects mortar or lime (defect-indicating sign). The first detection unit 14 detects a defect-indicating sign which is present in the image captured by the camera. For example, the detection may be performed by learning-type image recognition, or a detection target may be detected by texture analysis.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of detailed image data collected by the camera (for example, image data captured with high magnification, image data obtained by capturing a certain location for a long period of time, or the like) in the above state.

Application Example 9

In Application Example 9, an examining object is set to be piping, and defects to be detected are set to be mortar, lime, a tree root, or the like. In Application Example 8, a camera and a distance sensor are applied as the sensor unit 13.

The first detection unit 14 detects mortar, lime, or a tree root. The first detection unit 14 detects a mass (defect-indicating sign) having a size of a predetermined level or higher present in an image including distance information collected by the distance sensor.

When the first detection unit 14 detects a detection target, the drive control unit 15 controls the driving unit 12 to cause the base unit 11 to travel at a second speed lower than a first speed at which the base unit 11 is traveling or to cause the base unit 11 to stop traveling. The second detection unit 16 detects the above-mentioned defect on the basis of detailed image data collected by the camera (for example, image data captured with high magnification, image data obtained by capturing a certain location for a long period of time, or the like) in the above state.

Application Example 10

Application Examples 1 to 9 may be combined in any way.

According to the above-described example embodiment, a new defect detection technique using an autonomously movable apparatus is achieved. In addition, according to the detection system of the example embodiment, it is possible to achieve a reduction in time required for examination while maintaining the accuracy of detection of a defect.

Hereinafter, examples of a reference configuration will be appended.

1. A detection system including:
a drive control unit that controls traveling of a base member in a case where a predetermined detection target is detected on the basis of information collected by a sensor unit installed in the base member; and
a second detection unit that detects a predetermined defect on the basis of the information collected by the sensor unit.

2. The detection system according to 1, further including:
a first detection unit that detects a predetermined detection target on the basis of the information collected by the sensor unit installed in the base member;
the base member;
a driving unit that causes the base member to travel; and
the sensor unit.

3. The detection system according to 2,
wherein in a case where the first detection unit detects the detection target, the drive control unit causes the base member to travel at a speed lower than in a case where the first detection unit detects no detection target.

4. The detection system according to 3,
wherein in a case where the first detection unit detects the detection target, the drive control unit controls the driving unit to cause the base member to travel at a second speed lower than a first speed at which the base member is traveling or to cause the base member to stop traveling.

5. The detection system according to 4,
wherein the driving control unit controls the driving unit to cause the base member travel to travel at the first speed at a predetermined timing after the driving control unit controls the driving unit to cause the base member to travel at the second speed or to cause the base member to stop traveling.

6. The detection system according to 5,
wherein the predetermined timing is: a timing at which a predetermined time has passed since a timing at which the driving unit is controlled to cause the base member to travel at the second speed or to cause the base member to stop traveling; a timing at which a predetermined amount of data is collected by the sensor unit during traveling of the base member at the second speed or during stopping of the base member; or a timing at which detection processing of the second detection unit is ended.

7. The detection system according to any one of 2 to 6,
wherein in a case where the first detection unit detects the detection target, the second detection unit starts processing of detecting the predetermined defect.

8. The detection system according to any one of 2 to 7,
wherein the sensor unit has a first mode and a second mode having lower accuracy in information collection than the first mode, the sensor unit transitioning to the first mode in a case where the first detection unit detects the detection target.

9. The detection system according to any one of 1 to 8,
wherein the base member travels inside piping, and
wherein the second detection unit detects a defect in the piping.

10. A detection method executed by a computer, the method including:
a drive control step of controlling traveling of a base member in a case where a predetermined detection target is detected on the basis of information collected by a sensor unit installed in the base member, and
a second detection step of detecting a predetermined defect on the basis of the information collected by the sensor unit.

10-2. The detection method executed by a computer according to 10, further including
a first detection step of detecting a predetermined detection target on the basis of the information collected by the sensor unit installed in the base member.

10-3. The detection method according to 10-2,
wherein in a case where the detection target is detected in the first detection step, in the drive control step, the base member is caused to travel at a speed lower than in a case where no detection target is detected in the first detection step.

10-4. The detection method according to 10-3,
wherein the drive control step includes performing control, in a case where the detection target is detected in the first detection step, to cause the base member to travel at a second speed lower than a first speed at which the base member is traveling or to cause the base member to stop traveling.

10-5. The detection method according to 10-4,
wherein the drive control step includes performing control to cause the base member to travel at the first speed at a predetermined timing after performing control to cause the base member to travel at the second speed or to cause the base member to stop traveling.

10-6. The detection method according to 10-5,
wherein the predetermined timing is: a timing at which a predetermined period of time has passed from a timing at which control is performed to cause the base member to travel at the second speed or to cause the base member to stop traveling; a timing at which a predetermined amount of data is collected by the sensor unit during traveling of the base member at the second speed or during stopping of the base member; or a timing at which detection processing by the second detection unit is ended.

10-7. The detection method according to any one of 10-2 to 10-6,
wherein in the second detection step, processing of detecting the predetermined defect is started in a case where the detection target is detected in the first detection step.

10-8. The detection method according to any one of 10-2 to 10-7,
wherein the sensor unit has a first mode and a second mode having lower accuracy in information collection than the first mode, the sensor unit transitioning to the first mode in a case where the detection target is detected in the first detection step.

10-9. The detection method according to any one of 10 to 10-8,
wherein the base member travels inside piping, and
wherein a defect in the piping is detected in the second detection step.

11. A program causing a computer to function as:
a drive control unit that controls traveling of a base member in a case where a predetermined detection target is detected on the basis of information collected by a sensor unit installed in the base member; and
a second detection unit that detects a predetermined defect on the basis of the information collected by the sensor unit.

11-2. The program according to 11, causing the computer to further function as:
a first detection unit that detects a predetermined detection target on the basis of the information collected by the sensor unit installed in the base member.

11-3. The program according to 11-2,
wherein in a case where the first detection unit detects the detection target, the drive control unit causes the base member to travel at a speed lower than in a case where the first detection unit detects no detection target.

11-4. The program according to 11-3,
wherein in a case where the first detection unit detects the detection target, the drive control unit controls the driving unit to cause the base member to travel at a second speed lower than a first speed at which the base member is traveling or to cause the base member to stop traveling.

11-5. The program according to 11-4,
wherein the drive control unit performs control to cause the base member to travel at the first speed at a predetermined timing after causing the base member to travel at the second speed or causing the base member to stop traveling.

11-6. The program according to 11-5,
wherein the predetermined timing is: a timing at which a predetermined period of time has passed from a timing at which control is performed to cause the base member to travel at the second speed or to cause the base member to stop traveling; a timing at which a predetermined amount of data is collected by the sensor unit during traveling of the base member at the second speed or during stopping of the base member; or a timing at which detection processing by the second detection unit is ended.

11-7. The program according to any one of 11-2 to 11-6, wherein in a case where the first detection unit detects the detection target, the second detection unit starts processing of detecting the predetermined defect.

11-8. The program according to any one of 11-2 to 11-7, wherein the sensor unit has a first mode and a second mode having lower accuracy in information collection than the first mode, and the sensor unit transitioning to the first mode in a case where the first detection unit detects the detection target.

11-9. The program according to any one of 11 to 11-8, wherein the base member travels inside piping, and wherein the second detection unit detects a defect in the piping.

The application is based on Japanese Patent Application No. 2015-125836 filed on Jun. 23, 2015, the content of which is incorporated herein by reference.

What is claimed is:

1. A pipe defect detection system comprising:
a base member;
a sensor unit installed in the base member;
a first detection unit configured to detect a sign indicating the possibility of a presence of a defect on the basis of a sound or an image collected by the sensor unit while the base member travels at a first speed,
a drive control unit configured to cause the base member to stop traveling in a case where the sign indicating the possibility of the presence of the defect is detected; and
a second detection unit configured to detect a predetermined defect on the basis of the sound or the image collected by the sensor unit while the base member is stopped.

2. The pipe defect detection system according to claim 1, further comprising:
a driving unit that causes the base member to travel.

3. The pipe defect detection system according to claim 2, wherein the second detection unit is configured to, in a case where the first detection unit detects the sign indicating the possibility of the presence of the defect, start processing of detecting the predetermined defect.

4. The pipe defect detection system according to claim 1, wherein the driving control unit is further configured to cause the base member to start traveling at a predetermined timing after the driving control unit causes the base member to stop traveling.

5. The pipe defect detection system according to claim 4, wherein the predetermined timing is: a timing at which a predetermined period of time has passed from a timing at which the base member is caused to stop traveling; a timing at which a predetermined amount of data is collected by the sensor unit during stopping of the base member; or a timing at which detection processing by the second detection unit is ended.

6. The pipe defect detection system according to claim 1, wherein the sensor unit has a first mode and a second mode having a lower accuracy in information collection than the first mode, the sensor unit being configured to transition to the first mode in a case where the first detection unit detects the sign indicating the possibility of the presence of the defect.

7. The pipe defect detection system according to claim 1, wherein the base member is configured to travel inside piping, and
wherein the second detection unit is configured to detect a defect in the piping.

8. The pipe defect detection system according to claim 1, wherein the sign indicating the possibility of a presence of a defect is the presence of a mounting pipe, a coupling joint, or a joint between pipes.

9. A pipe defect detection method executed by a computer, the method comprising:
a first detection step of detecting a sign indicating the possibility of a presence of a defect on the basis of a sound or an image collected by a sensor unit installed in a base member while the base member travels at a first speed,
a drive control step of causing the base member to stop traveling in a case where the sign indicating the possibility of the presence of the defect is detected, and
a second detection step of detecting a predetermined defect on the basis of the sound or image collected by the sensor unit while the base member is stopped.

10. A non-transitory storage medium storing a program causing a computer to function as:
a first detection unit configured to detect a sign indicating the possibility of a presence of a defect on the basis of a sound or an image collected by a sensor unit installed in a base member while the base member travels at a first speed,
a drive control unit that is configured to cause the base member to stop traveling in a case where the sign indicating the possibility of the presence of the defect is detected; and
a second detection unit that is configured to detect a predetermined defect on the basis of the sound or the image collected by the sensor unit while the base member is stopped.

* * * * *